United States Patent [19]

Foster et al.

[11] Patent Number: 5,196,701

[45] Date of Patent: Mar. 23, 1993

[54] HIGH-RESOLUTION DETECTION OF MATERIAL PROPERTY VARIATIONS

[75] Inventors: John S. Foster, Morgan Hill; Kurt A. Rubin, Santa Clara; Jaquelin K. Spong, Mountain View, all of Calif.

[73] Assignee: International Business Machines Corporation, Armonk, N.Y.

[21] Appl. No.: 739,011

[22] Filed: Jul. 31, 1991

[51] Int. Cl.$^5$ .............................................. H01J 37/00
[52] U.S. Cl. .................................... 250/306; 250/307
[58] Field of Search ................... 250/306, 307, 422 F; 369/126

[56] References Cited

U.S. PATENT DOCUMENTS

| | | | |
|---|---|---|---|
| 4,343,993 | 8/1982 | Binnig et al. | 250/306 |
| 4,575,822 | 3/1986 | Quate | 365/174 |
| 4,724,318 | 2/1988 | Binnig | 250/306 |
| 4,760,032 | 7/1988 | Turner | 437/8 |
| 4,837,435 | 6/1989 | Sakuhara et al. | 250/306 |
| 4,916,688 | 4/1990 | Foster et al. | 369/126 |
| 4,941,753 | 7/1990 | Wickramasinghe | 250/307 |
| 5,060,248 | 10/1991 | Dumoulin | 250/306 |
| 5,065,103 | 11/1991 | Slinkman et al. | 324/662 |

OTHER PUBLICATIONS

Hamers et al., "Time-Resolved Tunneling Microscope", IBM Technical Disclosure Bulletin, vol. 31, No. 11, Apr. 1989.
W. D. Pohl, "Hypersound Generation and Detection", IBM Technical Bulletin, vol. 30, No. 8, Jan. 1988.

Primary Examiner—Bruce C. Anderson

[57] ABSTRACT

The method to detect and determine the profile of the material property or the structure changes not only on surface but also at the subsurface, of a storage medium or a scanned sample. This method comprises the following steps: (a), a nondestructive periodic or modulated perturbation is applied to the sample to be scanned. (b) the perturbed sample is then scanned using a microprobe, e.g., scanning tunneling microscopy (STM) or atomic force microscopy (AFM), which is responsive to the applied periodic or modulated perturbations and (c) the modulated output signals from the microprobe, in combination with the input perturbation signals, are processed and demodulated to automatically control the motion of the probe, and to determine the profiles of the material properties or the structure changes of the scanned sample.

11 Claims, 5 Drawing Sheets

HIGH-RESOLUTION DETECTION OF MATERIAL PROPERTY VARIATIONS

FIELD OF THE INVENTION

This invention relates to the application of scanning microprobe techniques such as scanning tunneling microscopy (STM) and atomic force microscopy (AFM) for the detection and imaging of non-topographic material or structural features on the surface or sub surface of a sample. More particularly, this invention relates to the readback of non-topographically encoded data by applying a nondestructive periodic or modulated perturbation to the storage medium and detecting the response of the medium using a scanning microprobe, e.g., an STM or AFM. Applications of this invention include ultra-high density data storage devices and integrated circuit manufacturing.

BACKGROUND OF THE INVENTION

The recent developments of scanning microprobe technology have made possible the detection and inspection of the topographical structure of a sample surface with sub nanometer resolution. The scanning tunneling microscope (STM) technology as disclosed in Binnig et al., U.S. Pat. No. 4,343,993, issued August 1982, is based on the tunneling currents which occur when a voltage is applied to an extremely fine conductive tip which is brought to a distance of approximately 1 nm from a surface structure. The tunneling current is generated when the conductive probe tip comes close enough to the surface so that the electron clouds surrounding the atoms in the tip and on the scanned surface overlap, thus allowing a current to flow between them when a voltage is applied. The magnitude of the tunneling current is exponentially dependent on the distance between the tip and the surface. Because of this sensitivity, the tunneling current is often used as a feedback signal to control the tip-sample separation. Additionally, the tunneling current is also a function of the conductivity of the scanned material and the surface structures. Therefore, by monitoring the variations of the tunneling current, the STM technique provides a means to detect a material structure change with a very fine resolution down to scale of individual atoms. A topographic map of a scanned surface with subnanometer resolution can be generated by scanning and monitoring the variations of the tunneling current.

One of the limitations of the scanning tunneling microscope is the requirement that the tunneling tip and the scanned surface either have to be electrically conductive or must be coated with an electrically conductive layer. Binnig, U.S. Pat. No. 4,724,318, "Atomic Force Microscope and Method for Imaging Surfaces with Atomic Resolution", issued Feb. 9, 1988, discloses an atomic force microscope (AFM) which generates a topographical image of a sample by monitoring the change of the STM tunneling current from the surface of a spring-like cantilever. The cantilever has a sharp-point fixed at one end. This sharp-point is brought to a very close proximity to the surface structure to be imaged. The atomic force between the sharp tip and the surface of the sample will cause small deflections of the cantilever corresponding to the topography of the surface. The STM in turn detects the tunneling current variations due to the deflections of the cantilever as the AFM scans the entire surface of the sample. Binnig, U.S. Pat. No. 4,724,318, by the use of an AFM, has overcome the limitation encountered in the STM technology where only a conductive surface or a conductively coated surface can be imaged.

By use of the STM or the AFM, a very high-density data storage device was proposed by topographically deforming the surface of a data storage medium to represent encoded binary bits. The encoded data is read back by scanning and detecting the bits using the STM or AFM. For example, in Quate, U.S. Pat. No. 4,575,822, "Method and Means for Data Storage Using Tunneling Current Data Readout", issued Mar. 11, 1986, a high-resolution data storage device is described in which the data is encoded as indentation, removal, or deposition of material to create a structural feature that can then be imaged. However, topographic encoding schemes are generally limited to a very low data rates because the microprobe must be servo controlled over the topographic features in order to avoid contacting and destroying the surface. Servo circuits for scanning microprobes have a bandwidth of typically 5 kHz, which is impractical for a data storage device. In addition, topographic encoding requires that the surface of the medium be exceedingly smooth so that blemishes are not misconstrued as data. This near-perfect surface must be protected from deterioration in the operating environment, for example, from oxidation or deposition of ambient contaminants. Many such schemes therefore require vacuum, protective overcoats, low temperature, inert gas flushing, or extensive filtration. Furthermore, there exists a large number of potential storage mechanisms which are non topographic and are not appropriate to the topographic readback methods disclosed in the prior art. Reliance on topographic encoding greatly limits the types of storage media that can be developed.

A method to write, read, and erase data bits which are non topographically encoded onto a storage medium by the use of an STM was disclosed by Foster et al., U.S. Pat. No. 4,916,688, "Data Storage Method Using State Transformable Materials", issued Apr. 10, 1990. Foster describes the use of a scanning tunneling microscope to selectively heat discrete areas of a state-transformable film by applying a large tunneling current to the area. Resistive heating in the film transforms the electronic structure in the area from a crystalline to an amorphous state, or from an amorphous to a crystalline state, depending on the nature of the tunneling current pulse. The change in electronic structure implies a change in conductance, work function, and band gap which can be detected by the STM as an alteration in the magnitude of the tunneling current. The effects of topography on the readback of data, e.g., the blemishes on the surface of the film, were minimized by measuring the rate of change of the current vs. the applied voltage (dI/dV) while keeping the tip/sample separation constant, or by measuring the rate of change of the tunneling current vs. the tip/sample separation (dI/dS) while keeping the voltage constant. However, this scheme, while minimizing the effect of surface topography, may be affected by the presence of material blemishes, such as oxidation or contamination, which would have to be minimized for the readback technique to operate. Furthermore, it may have difficulty with a protective overcoat because the readback technique is most sensitive to the surface layer of the film.

In some cases the material properties of the sampled surface can by themselves limit the effectiveness, i.e., the resolution of the STM application. Sakuhara et al., U.S. Pat. No. 4,837,435, "Tunneling Scanning Microscope Having Light Source", issued Jun. 6, 1989, had to apply a light to irradiate the surface to increase the conductivity in order to obtain a higher resolution in the investigation of the surface structure of the scanned material.

In the reading of discrete binary data from a storage medium using scanning microprobe techniques as disclosed in the prior art, each is limited by one or more of the following difficulties: (1) the speed of the device is limited by the bandwidth of the servo circuit that controls the motion of the tip over the topographically encoded data; (2) a near-perfect surface has to be fabricated; (3) this near-perfect surface has to be maintained under all operating conditions; (4) no protective layers can be used to protect the surface because it will affect the sensitivities of the scanning probe measurement; and (5) existing readback techniques are not sensitive to many potential bit storage mechanisms, greatly limiting the types of storage media that can be developed. Due to these problems, the development of an ultra-high density storage technology is hindered by the very high cost of both manufacturing the storage media and also maintaining the operational conditions in order to measure the highly sensitive tunneling currents for data detection.

SUMMARY OF THE INVENTION

It is therefore an object of the present invention to provide a solution to overcome the difficulties encountered in the prior art.

Accordingly, the first object of the present invention is to apply the microprobe scanning techniques for the determination of material profiles without being limited by the topographic characteristics of a surface.

Additionally, it is another object of the present invention to apply the microprobe scanning techniques for the determination of the material profile, not only on the surface but also at a subsurface of a storage medium or a scanned sample. The scanning sensitivity would therefore not be affected by the oxidation layer or a protective coating.

Furthermore, it is another object of this invention to increase the speed of scanning and the profile determination processes. By improving the signal-to-noise ratio, this invention teaches a method to achieve higher data rates, higher data density and less complicated data processing techniques.

The present invention teaches a method to detect and image the material property or structure changes not only on the surface but also at the subsurface of a storage medium or a scanned sample. This method comprises the following steps. First, a nondestructive periodic or modulated perturbation is applied to the sample to be scanned. The perturbed sample is then scanned using a microprobe, e.g., STM or AFM, which is responsive to the applied periodic or modulated perturbations. The modulated output signals from the microprobe, in combination with the input perturbation signals, are processed and demodulated to automatically control the motion of the probe and to determine the profiles of the material properties or the structure changes of the scanned sample.

This invention shows a way to broaden the scope of the applications of the microprobe by allowing variety of modulated perturbations to be applied to a scanned material and then to detect the material property changes using the scanning device and a demodulation system. As taught by this invention, the flexibility of being able to apply acoustic, electric, magnetic, mechanical, optical, thermal, and many other types of modulated perturbations in a scanning process can greatly broaden the scope of the microprobes in their scientific and industrial applications. Its flexibility would allow the application of the scanning technique as disclosed under various working conditions whenever there is a need to scan a material profile with a precision requirement down to the atomic scale.

DESCRIPTION OF THE PREFERRED EMBODIMENT

Figure 1:
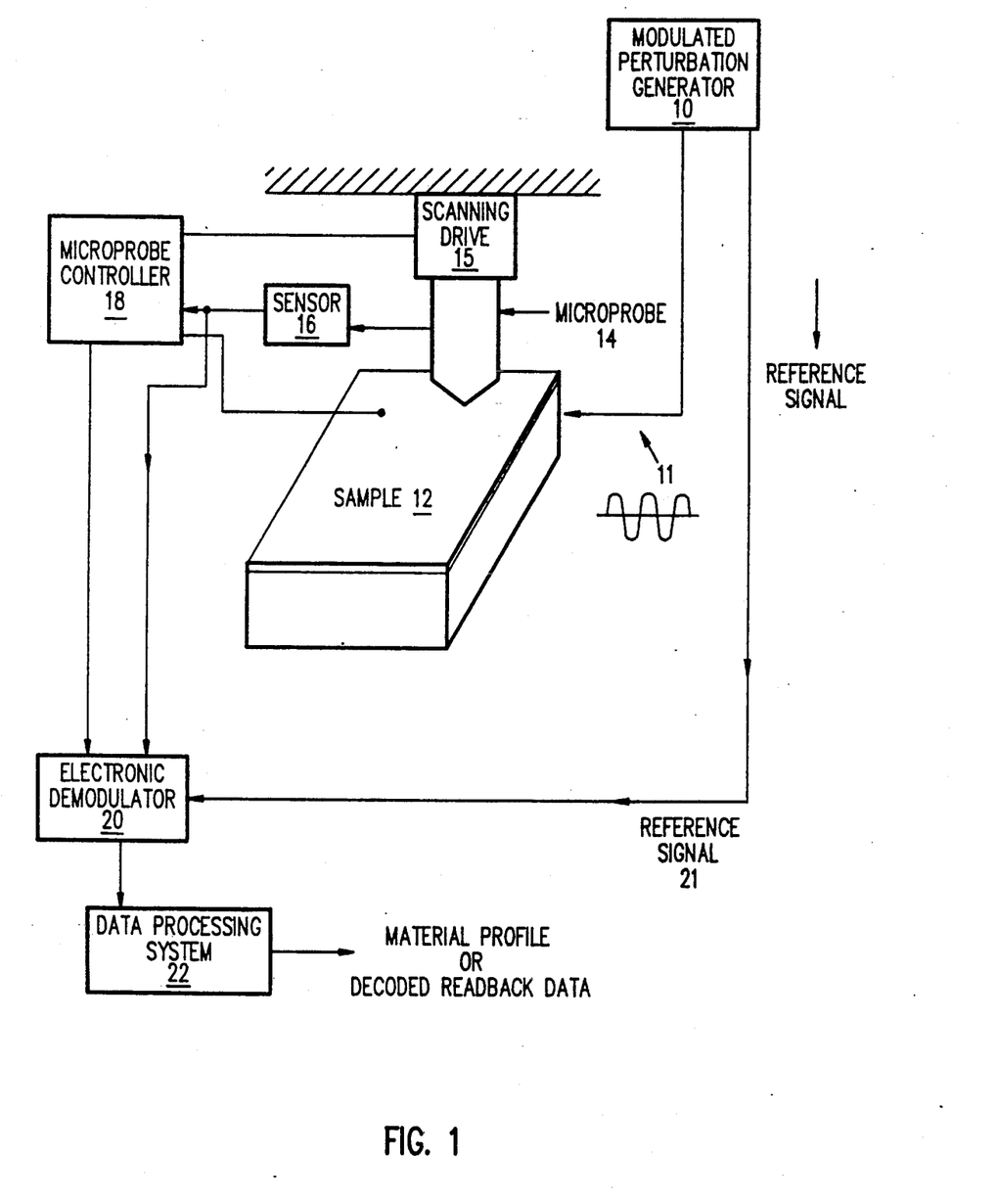
FIG. 1 is a combined perspective illustration and functional block diagram of a high-resolution scanning system according to the present invention.

FIG. 1 shows a high-resolution scanning system. Modulated perturbation generator 10 is connected to a scanned sample 12. Modulated perturbation 11, such as acoustic, electrical, magnetic, mechanical, optical, or thermal perturbations, are transmitted from the perturbation generator 10 to the sample 12. Modulated perturbation 11 is chosen such that areas in the sample 12 having material property variations, such as mechanical, compositional, or structural, respond differently to the perturbation according to the variations.

While the modulated perturbation 11 can be applied globally to the sample 12 or selectively to any small areas on the sample 12, the responses to the perturbation 11 from a very small area are monitored by a microprobe 14. Microprobe 14, such as an STM or AFM, responsive to the modulated perturbations 11, is disposed near the surface of the scanned sample 12. Microprobe 14 is electrically connected to a scanning drive 15, a sensor 16, and a microprobe controller 18. Controller 18 also receives input from the sensor 16 to make position adjustment through the scanning drive 15 to move the microprobe 14. The position adjustment is made by the controller 18 to maintain a controlled separation between the microprobe 14 and the sample surface. Output signals from the sensor 16 are then transmitted to an electronic demodulator 20. Electronic demodulator 20 also receives a reference signal 21 from the perturbation generator 10. The output from the demodulator 20 is the magnitude of the probe signal component, which has a definite phase relationship to the reference signal. This process decouples the contribution of the non-topographic changes to the signal from those of the unwanted topographic changes. When the microprobe is positioned over an area which interacts strongly with perturbation, the output from the demodulator is large compared to the signal obtained from other areas. The demodulated signal is monitored by a data processing system 22 to determine the location and profile of the material or structural changes in the scanned sample 12. For readback of prerecorded digital data, the demodulated signal undergoes additional processing to detect the presence of bits. This could be by use of a peak detector of threshold detector, for example. The detected signal is further processed by a reading channel which performs error detection and correction.

Figure 2:
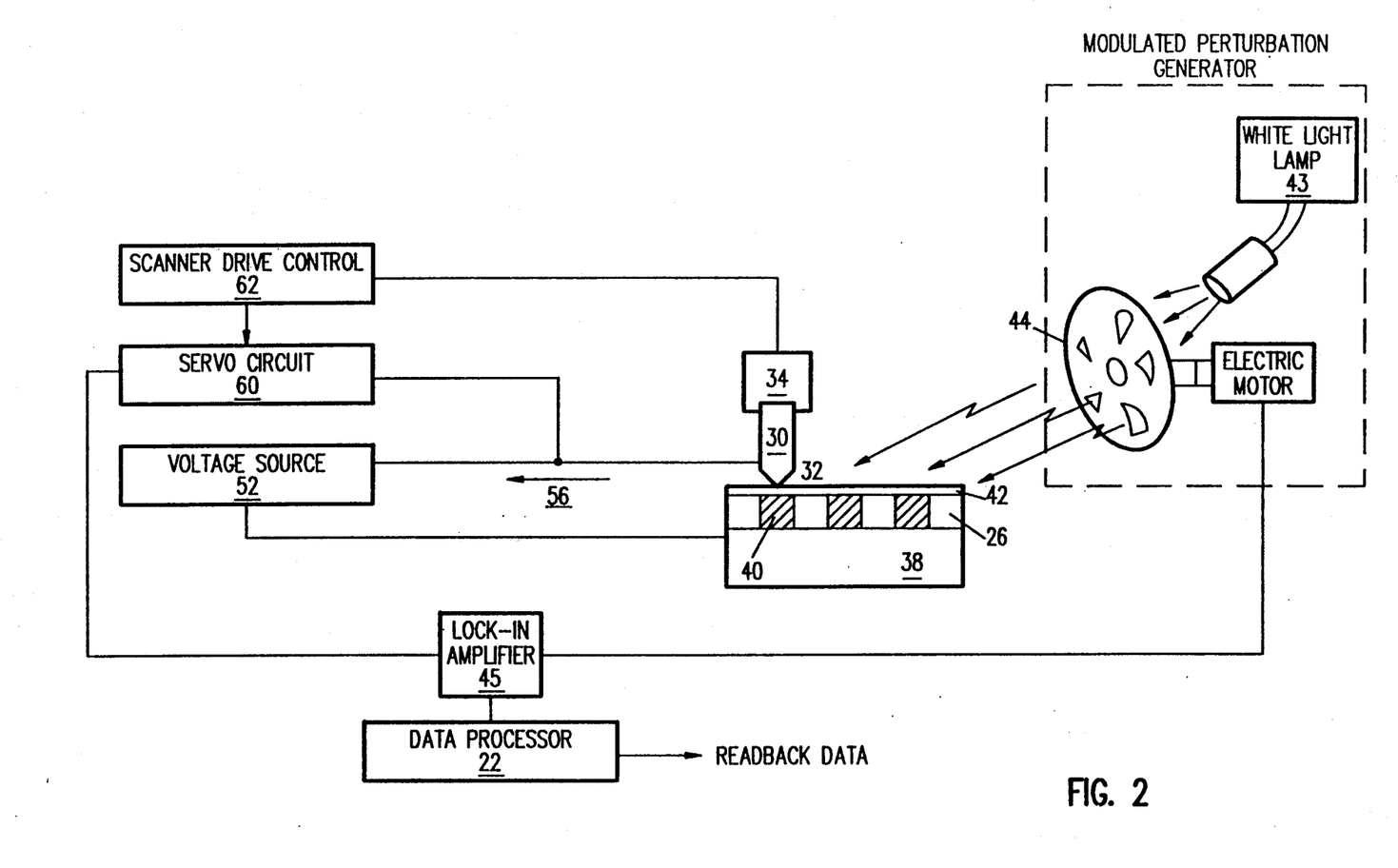
FIG. 2 is a combined perspective illustration and functional block diagram of a preferred embodiment showing an ultra-high density data storage device constructed according to the present invention.

FIG. 2 shows the preferred embodiment of the present invention in an ultra-high density data storage system. A storage medium 26 is scanned by an STM 30 by a piezo-electric tube scanner 34. Storage medium 26 is a thin film of approximately 400 angstroms of the phase-changeable material germanium telluride (GeTe) overlaying a silicon substrate 38. The data storage medium 26 is an amorphous film on which crystalline spots have been written, for example, using the method disclosed in Foster et al., U.S. Pat. No. 4,916,688. The result is an array of spots which can be switched reversibly between their amorphous and crystalline phases. In this embodiment, the GeTe film is protected by an oxidation layer 42 on its surface which is a optically transparent. This oxide layer has significant electrical resistance, thus preventing the STM from reading the state of the subsurface using the methods disclosed in the prior art.

The sample is perturbed with white light irradiation from a high-intensity lamp 43 (Assembly System Model 10-10127). The white light is modulated by passing it through the blades of a spinning chopper wheel 44 (Stanford Research System Model SR-540 Optical Chopper) which periodically obscures the beam. The light when unobstructed is incident on the sample where it penetrates the protective layer and is absorbed by the storage medium 26, beneath it. The generation of photoconductive electrons modulates the conductivity of the samples in areas where the conductivity is low, i.e., amorphous areas, but does not significantly affect the areas where the conductivity is already high, i.e., the crystalline areas. By demodulating the STM signal at the chopper blade frequency using a lock-in amplifier 45 (Stanford Research System Model SR-530 Lock-In Amplifier), areas of differing electronic phases can be distinguished, thereby determining the "bit state" of the area. The data processing equipment 22 monitors this signal and records the occurrence, location, or profile of the crystalline spots 40.

Figure 3:
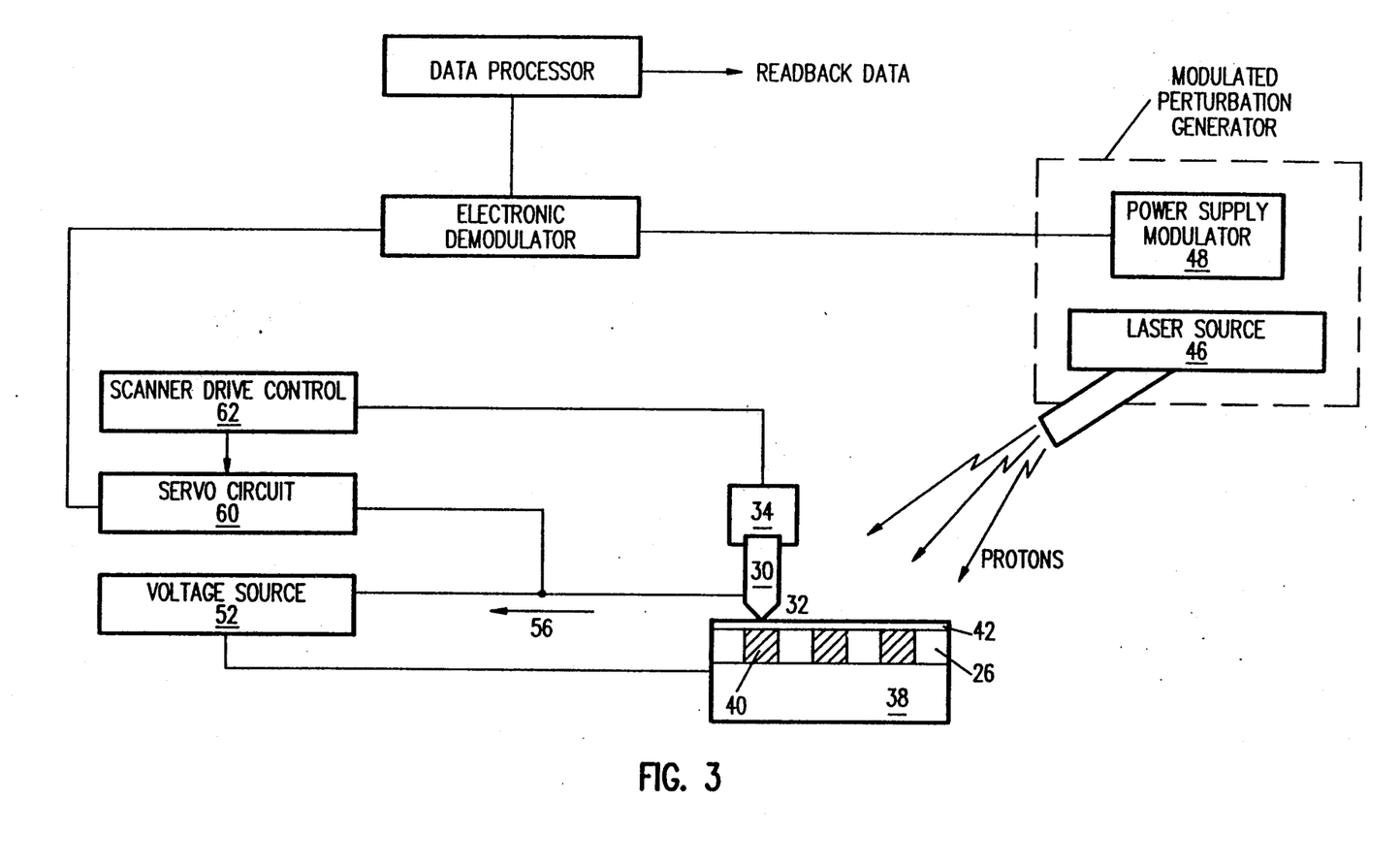
FIG. 3 is a combined perspective illustration and functional block diagram of an alternative embodiment of an ultra-high, density, high-speed data storage system according to the present invention.

A similar alternative embodiment applying the same underlying principles to carry out the invention is shown in FIG. 3, where the elements as shown in this figure are identical to those of FIG. 2 with the exception that the perturbation is delivered by a pulsed semiconductor laser 46. The high intensity and focused laser source produces more photoconductive electrons and therefore a larger modulation of the tunneling current over the amorphous areas. The larger signal-to-noise ratio permits faster modulation frequencies and faster scan rates.

Figure 4:
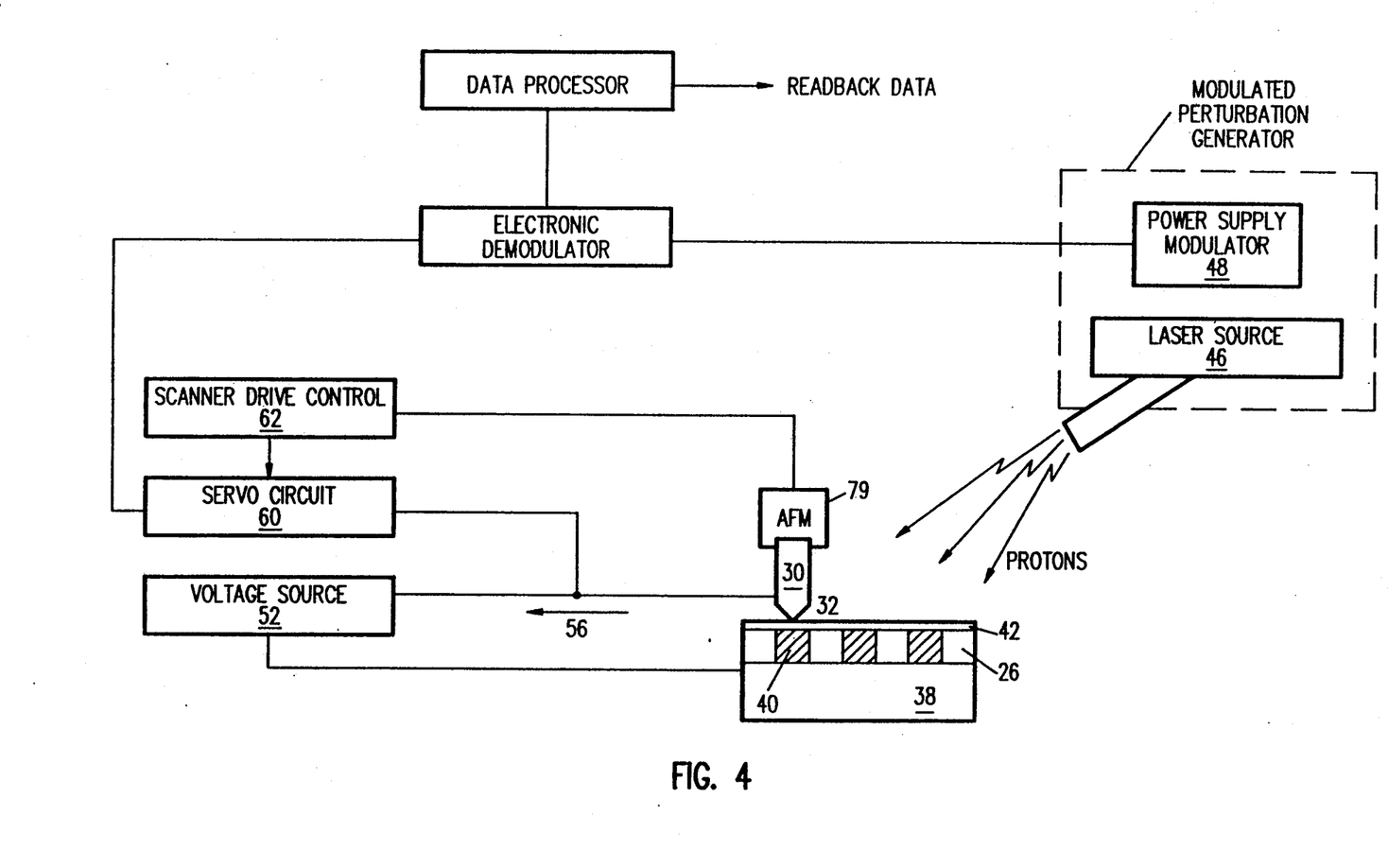
FIG. 4 is a combined perspective illustration and functional block diagram of a second alternative embodiment of an ultra-high density, high-speed data storage system according to the present invention.

Another alternative embodiment applying the same underlying principles to carry out the invention is shown in FIG. 4, where the elements as shown in this figure are identical to those of FIG. 3 with the exception that the readback of the data, encoded as crystalline spot, is accomplished by an atomic force microscope (AFM) 79 rather than the STM 30. AFM 79 measures the differential expansion of the GeTe film caused by the heat generated by the absorption of the laser photons. The crystalline areas have a different absorption coefficient from the amorphous areas, and the heat generated by the absorption causes a differential expansion of the film. This expansion is detected by the AFM as a small movement of the film toward the AFM tip. The signal processing and data collection equipment is identical to that shown for the embodiment in FIG. 3.

Figure 5:
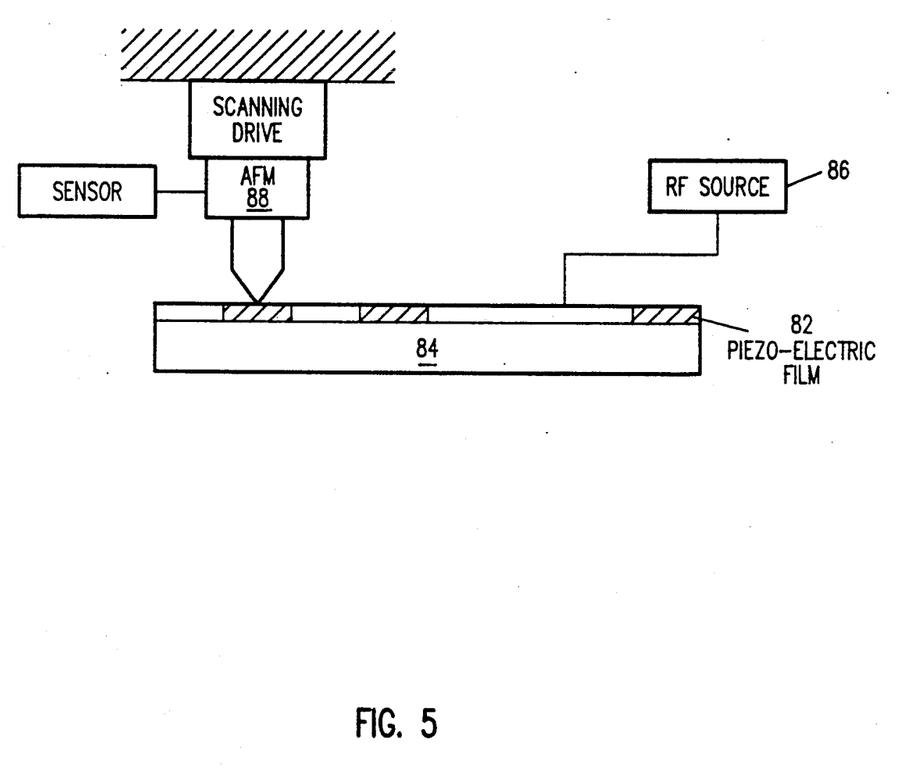
FIG. 5 is a combined perspective illustration and functional block diagram of a third alternative embodiment of an ultra-high density, high-speed data storage system according to the present invention.

A fourth alternative embodiment is shown in FIG. 5, which shows a high-resolution scanning system used to detect areas in a thin film sample which are piezo-electric such as lead zirconate-titanate (PZT) and ZnO. A modulated electric field is applied globally to the thin film sample by use of a high-frequency source 86 located next to the sample 82. Areas of the film which are piezo-electric expand and contract as a function of electric field strength, whereas areas which are non-piezo-electric are unresponsive to the perturbation. This differential expansion can be detected by an AFM 88 scanning over the storage medium. The output signal of the AFM is processed as before by the demodulator and data processing equipment.

According to the present invention, it would be obvious for those skilled in the art that perturbations other than the perturbations disclosed in the above preferred embodiments, i.c., laser irradiation and electric field, other types of modulated perturbations, such as acoustic, magnetic, mechanical, or thermal perturbations, can also be applied to the samples to be scanned.

Specific embodiments of this invention with a system configuration such as those described in FIGS. 3, 4, and 5 may include, but are not limited to, the following:

1. A high resolution scanning device to image a magneto-strictive thin film by applying a modulated magnetic field. Areas which are magneto-strictive expand and contract as a function of the magnetic field strength, and can therefore be distinguished from a non magneto-strictive area using the techniques described herein.

2. A piezo-electric thin film data storage device in which a modulated electric field is applied causing the film thickness to modulate in space depending on the state of the bit. The bit state can be written by polling region of the sample using the electric field of an STM tip.

3. A high-resolution scanning device where a piezo-electric thin film medium is subjected to modulated stress, resulting in induced voltage on areas which are piezo-electric. The induced voltage results in a modulation of the tunneling current.

4. A high-density data storage device in which the bits are written on a storage medium by selectively doping areas. The storage medium is perturbed by illuminating with modulated electromagnetic radiation, e.g., a laser beam, which generates electron-hole pairs. The high-speed data readback is accomplished by measuring the tunneling current variations caused by the differential photo conductivity on the storage medium.

5. A medium in which the bulk modulus has been altered by indentation or delamination. The data can be read by applying modulated stress, e.g., an acoustic wave, and detecting the differential strain from the bits.

6. A medium in which thermal properties, e.g., thermal conductivity, coefficient of thermal expansion, or heat capacity, were altered by changing the electronic or structural properties of the thin film. The data can be read back by modulating the temperature of the medium, causing differential expansion of the medium surface which could be detected by an STM or AFM.

7. A medium in which the data is encoded by changing the lattice structure, e.g, a crystalline or amorphous phase, which causes a change in the optical properties of the material. Readback is performed by applying a modulated light source and detecting the amount of photoconductivity which is dependent on the state of the bit.

The essential features of this invention which enable it to overcome difficulties encountered in the prior art are: (1) The use of a modulated perturbation to decouple the data signal from topography. (2) the use of non topographic encoding schemes so that the readback data rate is not necessarily limited by the detector servo bandwidth; (3) the use of nonlocal perturbation mechanisms that can penetrate a surface layer and interrogate the bit state of the sub surface; and (4) the applicability of these techniques to a wide variety of systems, extending the ability of scanning microprobe techniques to image non-topographic features.

While the invention has been shown and described with reference to the embodiments above, it will be understood by those skilled in the art that various changes in form and detail may be made therein without departing from the essence, scope, and teaching of the invention. For example, any type of microprobe may be used such as capacitive, thermal, or magnetic force scanning microprobes. Also, any of a large variety of media may be used having different material property variations used for scanning such as electronic, magnetic, photovoltaic, mechanical, thermal, acoustic, or optical properties. The perturbation mechanism may be chosen as appropriate to the medium and could include but not be limited to light, heat, electric, magnetic, or acoustic fields, or stress, or in any combination. Accordingly, the invention disclosed herein is to be limited only as specified in the following claims.

We claim:

1. A method for detecting non-topographic surface or subsurface material property variations of a sample with approximately nanometer resolution comprising the steps of:
    (a) applying at least one type of nondestructive modulated perturbation to the sample to produce a detectable change in said sample corresponding to said material property variations;
    (b) scanning said perturbed sample with a microprobe responsive to said detectable change to generate an output signal having first and second contributions related to topographic and non-topographic material property variations of the sample, respectively, and having a definite phase relationship with the modulated perturbation; and
    (c) processing said output signal from the microprobe in combination with the modulated perturbation to decouple said first and second contributions of the output signal, thereby demodulating and detecting the material property variations over the scanned sample.

2. A method as recited in claim 1, wherein:
    the step of applying includes producing a reference signal related to the perturbation;
    the step of scanning includes generating said output signal, which has a definite phase relationship with the reference signal; and
    the step of processing includes processing said output signal in combination with said reference signal.

3. A method for reading data from a data storage medium where encoded data is prerecorded on the medium, by varying non-topographical material properties on the surface or the subsurface of the storage medium, comprising the steps of:
    (a) applying at least one type of nondestructive modulated perturbation to the storage medium to produce a detectable change to said storage medium corresponding to said prerecorded data;
    (b) scanning the perturbed storage medium with a microprobe responsive to said detectable change to generate an output signal having first and second contributions related to topographic and non-topographic material property variations of the storage medium, respectively, and having a definite phaser relationship with the modulated perturbation; and
    (c) processing the output signal from the microprobe in combination with the modulated perturbation to decouple said first and second contributions of the output signal, thereby demodulating and reading back the prerecorded data from the data storage medium.

4. A method as recited in claim 3, wherein:
    the step of applying includes producing a reference signal related to the perturbation;
    the step of scanning includes generating said output signal, which has a definite phase relationship with the reference signal; and
    the step of processing includes processing said output signal in combination with said reference signal.

5. An apparatus for imaging non-topographical material property variations over the surface or the subsurface of a scanned sample with approximately nanometer resolution comprising:
    a modulated perturbation generator for generating modulated perturbations, for transmitting the modulated perturbations to said scanned sample to produce a detectable change in said sample corresponding to said material property variations, and for producing a reference signal related to the perturbations;
    a microprobe having a fine tip disposed close to the surface of the scanned sample, said microprobe being responsive to said detectable change to generate an output signal having first and second contributions related to topographic and non-topographic material property variations of the sample, respectively, and having a definite phase relationship with the reference signal;
    a microprobe drive control system for positioning and controlling the movement of the microprobe over the surface of the scanned sample; and
    a demodulator for receiving the reference signal from the perturbation generator and said output signal from the microprobe and for decoupling said first and second contributors of the output signal, thereby demodulating said output signal received from the microprobe, whereby in scanning over the sample, an image of the material proprty variations is generated.

6. An apparatus for imaging non-topographical material property variations over the surface or subsurface of a scanned sample as defined in claim 5, wherein;
    the modulated perturbation generator is a modulated laser source irradiating a modulated laser beam onto the scanned sample surface to produce a detectable photo-conductivity change over said surface or subsurface corresponding to said material property variations; and the microprobe is a scanning tunneling microscope (STM) for detecting a tunneling current variation caused by said detectable photo-conductivity change, whereby an image of the material property variations is generated.

7. An ultra-high density data storage system in which data is read from a state-transformable storage medium where encoded data is prerecorded in the medium by changing a non-topographical material property on the surface or the subsurface of the storage medium representing different states, comprising:

a modulated perturbation generator for generating modulated perturbations, for transmitting the modulated perturbations to the storage medium to produce a detectable change in said storage medium corresponding to said prerecorded data, and for producing a reference signal related to the perturbation;

a microprobe having a fine tip disposed close to the surface of the storage medium, said fine tip being responsive to said detectable change to generate an output signal having first and second contributions related to topographic and non-topographic material property variations of the storage medium, respectively, and a define phase relationship with the reference signal;

a demodulator for receiving the reference signal from the perturbation generator and the output signal from the microprobe and for decoupling said first and second components of the output signal, thereby demodulating the output signal, whereby the microprobe reads the prerecorded data from the storage medium.

8. An ultra-high density data storage system of claim 7, wherein the scanning control system further receives said output signal from the microprobe for maintaining the microprobe at a predefined constant distance from the surface of the storage medium.

9. An ultra-high density data storage system for reading data from a storage medium having a substrate and a state-transformable thin film thereon, a plurality of encoded data being prerecorded thereon by applying sufficient voltage pulses to the probe tip of a scanning tunneling microscope (STM) for selectively heating discrete areas in changing said discrete areas from one state to a different state, said storage medium being further covered with a protective layer thereon, said data storage system comprising:

a modulated perturbation generator for generating and transmitting modulated laser irradiation to the storage medium, said laser irradiation being capable of penetrating through the protective layer on the storage medium, thereby irradiating upon the state-transformable thin film causing a detectable non-topographic state-dependent electronic property variation, said generator including means for producing a reference signal related to the modulated laser irradiation;

an STM drive control system coupled to the STM for controlling and positioning the movement of the STM with said STM probe tip disposed close to the surface of the storage medium in scanning over the storage medium, said STM being sensitive to said detectable state dependent electronic property variation, and for generating a tunneling current as an output signal having first and second contributions related to topographic and non-topographic material property variations of the storage medium, respectively, and having a definite phase relationship with the reference signal; and a demodulator for receiving the reference signal from the perturbation generator and the output signal from the STM and for decoupling said first and second contributions of the output signal, thereby demodulating the output signal from the STM, whereby the STM, in scanning over the surface under the control of the STM drive control system, reads the encoded data prerecorded on the storage medium.

10. An ultra-high density data storage system reading data from a storage medium having a substrate and a state-transformable thin film thereon wherein encoded data is prerecorded by applying sufficient voltage pulses to the probe tip of a scanning tunneling microscope (STM) for selectively heating discrete areas in changing said discrete areas form one state to a different state, said storage medium being further covered with a protective layer thereon, comprising:

an atomic force microscope (AFM) having a fine probe tip;

a modulated perturbation generator for generating and transmitting modulated laser irradiation to the storage medium, said laser irradiation being capable of penetrating through the protective layer on the storage medium, thereby irradiating upon the state-dependent thermal expansion said generator including means for producing a reference signal related to the modulated laser irradiation;

an AFM drive control system coupled to the AFM for controlling and positioning the movement of the AFM with the AFM probe tip disposed close to the surface of the storage medium in scanning over the medium, said AFM being sensitive to said detectable state-dependent thermal expansion, and for generating an AFM tip deflection as an output signal having first and second contributions related to topographic and non-topographic material property variations of the storage medium, respectively, and a define phase relationship with the reference signal a demodulator for receiving the reference signal from the perturbation generator and said output signal form the AFM, and for decoupling said first and second contributions of the output signal, thereby demodulating the output signal form the AFM, whereby the AFM, in scanning over the surface under the control of the AFM drive control system, reads the encoded data prerecorded on the storage medium.

11. An ultra-high density storage system reading data from a storage medium having a substrate and a piezoelectric thin film thereon wherein encoded data is prerecorded by doping non-piezo-electric materials at discrete areas for changing the piezo-electric coefficient in the discrete areas from one state to a different state, said storage medium being further covered with a protective layer thereon, comprising:

an atomic force microscope (AFM) having a fine probe tip; and a modulated perturbation generator for generating and transmitting a high-frequency modulated electric field to the storage medium, said modulated electric field being capable of causing the piezoelectric thin film to expand and contract as a function of the electric field strength, and the piezoelectric coefficients thus causing a detectable state-dependent thin film movement;

an AFM drive control system coupled to the AFM for controlling and positioning the movement of the AFM with the AFM probe tip disposed close to the surface of the storage medium in scanning over the storage medium, said AFM being sensitive to said detectable state dependent thin film movement to generate an AFM tip deflection as an output signal; and a demodulator for receiving a reference signal from the perturbation generator and said output signal from the AFM and demodulating the output signal form the AFM, whereby, in scanning over the surface under the control of the AFM drive control system, the AFM reads the prerecorded data on the storage medium.

* * * * *